US011752931B1

(12) United States Patent
Smith

(10) Patent No.: US 11,752,931 B1
(45) Date of Patent: Sep. 12, 2023

(54) CONDITION RESPONSIVE VEHICULAR TAILLIGHT

(71) Applicant: Robert Smith, Temple, GA (US)

(72) Inventor: Robert Smith, Temple, GA (US)

(*) Notice: Subject to any disclaimer, the term of this patent is extended or adjusted under 35 U.S.C. 154(b) by 0 days.

(21) Appl. No.: 17/572,780

(22) Filed: Jan. 11, 2022

(51) Int. Cl.
*B60Q 1/44* (2006.01)
*F21S 43/14* (2018.01)
*B60Q 1/30* (2006.01)

(52) U.S. Cl.
CPC .......... *B60Q 1/445* (2013.01); *B60Q 1/302* (2013.01); *B60Q 1/441* (2013.01); *B60Q 1/444* (2013.01); *F21S 43/14* (2018.01); *B60Q 2400/20* (2013.01)

(58) Field of Classification Search
CPC ........ B60Q 1/302; B60Q 1/441; B60Q 1/444; B60Q 1/445; F21S 43/14
See application file for complete search history.

(56) References Cited

U.S. PATENT DOCUMENTS

| 10,315,559 | B2* | 6/2019 | Hammock | B60Q 1/445 |
| 10,358,082 | B1* | 7/2019 | Kinney | B60Q 1/302 |
| 10,893,716 | B2 | 1/2021 | Kinney | |
| 10,981,496 | B2 | 4/2021 | Schaye | |
| D919,142 | S | 5/2021 | Wu | |
| 11,046,241 | B2* | 6/2021 | Hammock | B60Q 1/2676 |
| 2007/0132574 | A1 | 6/2007 | Yen | |
| 2010/0066528 | A1* | 3/2010 | Kim | B60Q 1/447 340/479 |
| 2010/0085180 | A1 | 4/2010 | Mathis | |
| 2011/0057786 | A1 | 3/2011 | Giddens | |
| 2013/0141231 | A1* | 6/2013 | Aberizk | B60T 7/10 340/467 |
| 2014/0354422 | A1* | 12/2014 | Olson | B60Q 1/445 340/467 |
| 2018/0186421 | A1 | 7/2018 | Goodson | |
| 2018/0312105 | A1* | 11/2018 | Bartell | G01P 15/08 |

FOREIGN PATENT DOCUMENTS

WO    2020023060    1/2020

* cited by examiner

*Primary Examiner* — Christopher E Dunay
(74) *Attorney, Agent, or Firm* — Kyle A. Fletcher, Esq.

(57) ABSTRACT

The condition responsive vehicular taillight is a safety device. The condition responsive vehicular taillight incorporates a vehicle and a control circuit. The control circuit mounts in the vehicle. The control circuit senses changes in the momentum of the vehicle. The control circuit generates a visual indication of the changes in the momentum of the vehicle. The visual indication is visible from the exterior of the vehicle. The visual indication is visible when viewed from the rear side of the vehicle.

13 Claims, 4 Drawing Sheets

CONDITION RESPONSIVE VEHICULAR TAILLIGHT

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle signaling devices. (A42B3/0453)

SUMMARY OF INVENTION

The condition responsive vehicular taillight is a safety device. The condition responsive vehicular taillight comprises a vehicle and a control circuit. The control circuit mounts in the vehicle. The control circuit senses changes in the momentum of the vehicle. The control circuit generates a visual indication of the changes in the momentum of the vehicle. The visual indication is visible from the exterior of the vehicle. The visual indication is visible when viewed from the rear side of the vehicle.

These together with additional objects, features and advantages of the condition responsive vehicular taillight will be readily apparent to those of ordinary skill in the art upon reading the following detailed description of the presently preferred, but nonetheless illustrative, embodiments when taken in conjunction with the accompanying drawings.

In this respect, before explaining the current embodiments of the condition responsive vehicular taillight in detail, it is to be understood that the condition responsive vehicular taillight is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the condition responsive vehicular taillight.

It is therefore important that the claims be regarded as including such equivalent construction insofar as they do not depart from the spirit and scope of the condition responsive vehicular taillight. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
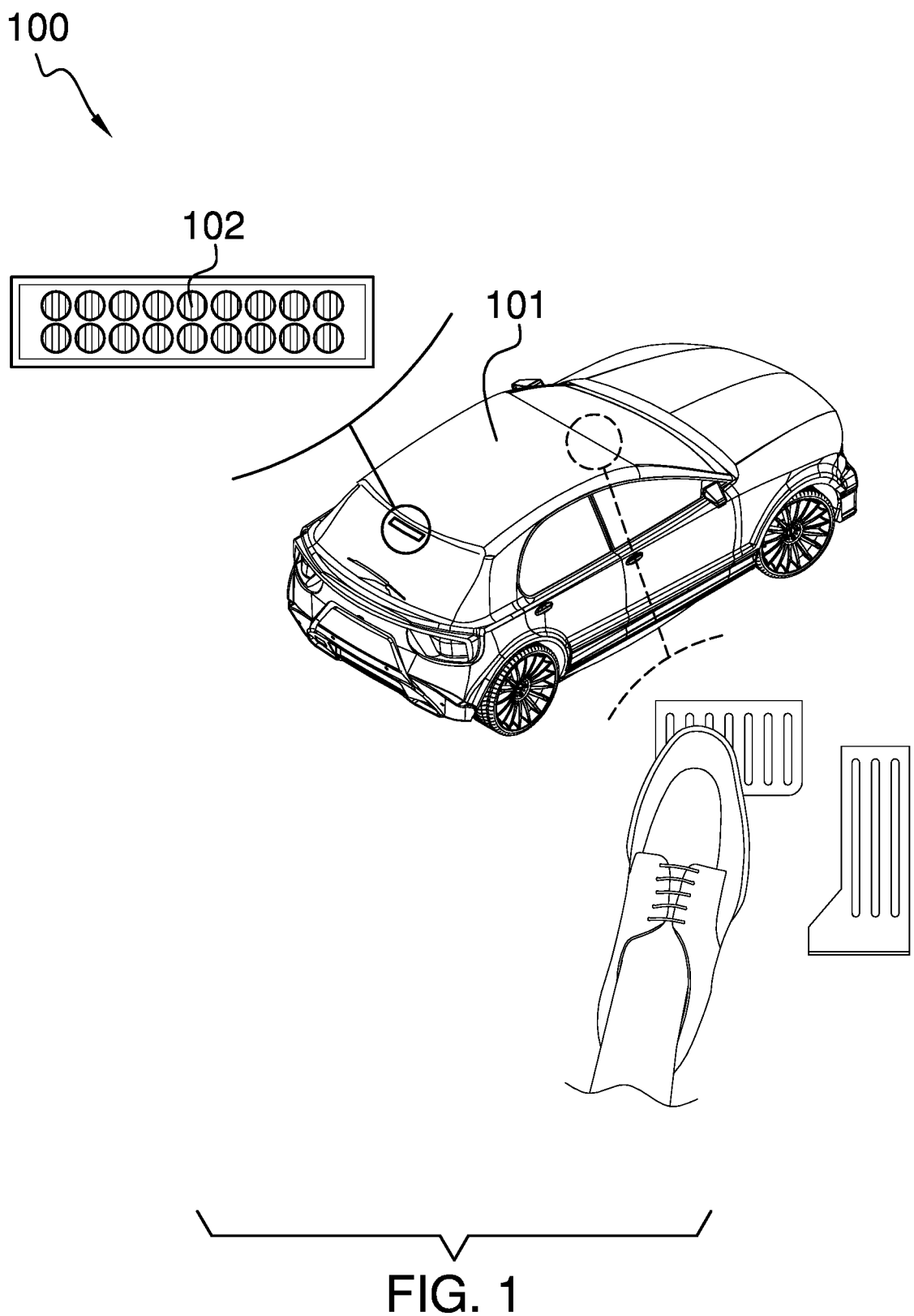
FIG. 1 is a detail view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The condition responsive vehicular taillight 100 (hereinafter invention) is a safety device. The invention 100 incorporates a vehicle 101 and a control circuit 102. The control circuit 102 mounts in the vehicle 101. The control circuit 102 senses changes in the momentum of the vehicle 101. The control circuit 102 generates a visual indication of the changes in the momentum of the vehicle 101. The visual indication is visible from the exterior of the vehicle 101. The visual indication is visible when viewed from the rear side of the vehicle 101.

The vehicle 101 is a motorized vehicle 101. The vehicle 101 is configured for use in transporting passengers and cargo over a road network. The vehicle 101 further comprises a brake signal 111. The brake signal 111 is an electrically generated control signal that is transmitted from the vehicle 101 to the control circuit 102. The brake signal 111 is generated by the vehicle 101. The brake signal 111 indicates to the control circuit 102 that the brakes of the vehicle 101 have been engaged.

The control circuit 102 is an electric circuit. The control circuit 102 controls the generation of the visual indications of the change in the momentum of the vehicle 101. The control circuit 102 senses the change in the momentum of the vehicle 101. The control circuit 102 receives the brake signal 111 from the vehicle 101. The control circuit 102 uses the change in the momentum of the vehicle 101 and the brake signal 111 to determine the specific visual indication to be displayed. The control circuit 102 physically generates the selected visual indication. The control circuit 102 comprises a logic circuit 121, a plurality of LED sets 122, a plurality of electric signals 123, and a momentum sensor 124. The logic circuit 121, the plurality of LED sets 122, the plurality of electric signals 123, and the momentum sensor 124 are electrically interconnected.

The logic circuit 121 is an electric circuit. The logic circuit 121 is defined elsewhere in this disclosure. The logic circuit 121 receives as input an electrically generated control signal from the momentum sensor 124. The logic circuit 121 uses the electric generated control signal generated by the momentum sensor 124 to determine whether the momentum of the vehicle 101 is changing in a manner selected from the group consisting of: a) the vehicle 101 is accelerating; b) the vehicle 101; and, c) the vehicle 101 is experiencing no change in momentum. The logic circuit 121 further receives as input the electrically generated control signal from the brake signal 111 of the vehicle 101. The logic circuit 121 uses the electrically generated control signal generated by the brake signal 111 to determine whether the brake of the vehicle 101 is engaged. The logic circuit 121 generates an electric signal selected from the plurality of electric signals 123.

The logic circuit 121 uses the information received from the momentum sensor 124 and the brake signal 111 to determine which electric signal selected from the plurality of electric signals 123 to generate. The momentum sensor 124 is an electric sensor. The momentum sensor 124 measures the change of the momentum of the vehicle 101 during the operation of the vehicle 101. The logic circuit 121 electrically connects to the momentum sensor 124. The logic circuit 121 monitors the momentum sensor 124.

Each electric signal selected from the plurality of electric signals 123 is a control signal. Each electric signal selected from the plurality of electric signals 123 electrically connects to an LED set selected from the plurality of LED sets 122. Each electric signal selected from the plurality of electric signals 123 electrically connects to the logic circuit 121. The logic circuit 121 physically generates each electric signal selected from the plurality of electric signals 123. The logic circuit 121 uses the plurality of electric signals 123 to control the illumination of each LED set selected from the plurality of LED sets 122. Each electric signal selected from the plurality of electric signals 123 provides the electric energy required for the illumination of the LED set associated with the selected electric signal. The plurality of electric signals 123 comprises an acceleration signal 131, a deceleration signal 132, a hard braking signal 133, and a no momentum change signal 134.

The acceleration signal 131 is the signal selected from the plurality of electric signals 123 that indicates that the vehicle 101 is accelerating. The logic circuit 121 generates the acceleration signal 131 when the momentum sensor 124 indicates to the logic circuit 121 that the vehicle 101 is accelerating.

The deceleration signal 132 is the signal selected from the plurality of electric signals 123 that indicates that the vehicle 101 is decelerating. The logic circuit 121 generates the deceleration signal 132 when the momentum sensor 124 indicates to the logic circuit 121 that the vehicle 101 is decelerating.

The hard braking signal 133 is the signal selected from the plurality of electric signals 123 that indicates that the vehicle 101 is rapidly decelerating. The logic circuit 121 generates the hard braking signal 133 when: a) the momentum sensor 124 indicates to the logic circuit 121 that the vehicle 101 is decelerating; while simultaneously, b) the brake signal 111 further indicates to the logic circuit 121 that the brake of the vehicle 101 is engaged.

The no momentum change signal 134 is the signal selected from the plurality of electric signals 123 that indicates that the vehicle 101 is not experiencing a change in momentum. The logic circuit 121 generates the no momentum change signal 134 when the momentum sensor 124 indicates to the logic circuit 121 that the vehicle 101 is not experiencing a change in momentum Each LED set selected from the plurality of LED sets 122 comprises a plurality of LEDs. The LED is a two terminal device used to generate illumination. Each LED set selected from the plurality of LED sets 122 electrically connects to an electric signal selected from the plurality of electric signals 123. The operation of each LED set selected from the plurality of LED sets 122 is controlled by the electric signal selected from the plurality of electric signals 123 that is associated with the selected LED set. The logic circuit 121 uses the plurality of electric signals 123 to control the operation of the plurality of LED sets 122.

Any LED initially selected from any LED set selected from the plurality of LED sets 122 is identical to any LED subsequently selected from the same selected LED set. The hue of the LEDs contained within any LED set initially selected from the plurality of LED sets 122 is visually distinct from the hue of the LEDs contained within any LED set subsequently selected from the plurality of LED sets 122. The hue of each LED set selected from the plurality of LED sets 122 visually indicates the momentum status of the vehicle 101. The momentum status of the vehicle 101 is described elsewhere in this disclosure.

The plurality of LED sets 122 comprises a first LED set 141, a second LED set 142, a third LED set 143, and a fourth LED set 144.

The first LED set 141 is the LED set selected from the plurality of LED sets 122 that visually indicates that the vehicle 101 is accelerating.

The second LED set 142 is the LED set selected from the plurality of LED sets 122 that visually indicates that the vehicle 101 is decelerating. The hue of the LEDs contained in the second LED set 142 is visually distinct from the hue of the LEDs contained in the first LED set 141.

The third LED set 143 is the LED set selected from the plurality of LED sets 122 that visually indicates that the vehicle 101 is decelerating. The hue of the LEDs contained in the third LED set 143 is visually distinct from the hue of the LEDs contained in the second LED set 142. The hue of the LEDs contained in the third LED set 143 is visually distinct from the hue of the LEDs contained in the first LED set 141.

The fourth LED set 144 is the LED set selected from the plurality of LED sets 122 that visually indicates that the vehicle 101 is decelerating. The hue of the LEDs contained in the fourth LED set 144 is visually distinct from the hue of the LEDs contained in the third LED set 143. The hue of the LEDs contained in the fourth LED set 144 is visually distinct from the hue of the LEDs contained in the second LED set 142. The hue of the LEDs contained in the fourth LED set 144 is visually distinct from the hue of the LEDs contained in the first LED set 141.

The acceleration signal 131 electrically connects to the first LED set 141 such that the first LED set 141 is illuminated when the logic circuit 121 actuates the acceleration signal 131. The deceleration signal 132 electrically connects to the second LED set 142 such that the second LED set 142 is illuminated when the logic circuit 121 actuates the deceleration signal 132. The hard braking signal 133 electrically connects to the third LED set 143 such that the third LED set 143 is illuminated when the logic circuit 121 actuates the hard braking signal 133. The no momentum change signal 134 electrically connects to the fourth LED set 144 such that the fourth LED set 144 is illuminated when the logic circuit 121 actuates the no momentum change signal 134.

The following definitions were used in this disclosure:

Brake: As used in this disclosure, a brake is a device that is used to slow or stop the motion of a machine or a vehicle.

CIE: As used in this disclosure, the CIE is an acronym for the International Commission on Illumination.

CIELAB: As used in this disclosure, the CIELAB is a color space coordinate system that is used to specify color. The CIELAB is a system that is defined and maintained by the International Commission on Illumination. At the time of this disclosure, the current CIELAB is referred to as CIELAB2000. The CIELAB specifies a color in a three-dimensional color space that is often referred to as the LAB. The overall difference between a target shade standard and a measured sample shade is called the delta E. A delta E of greater than 0.5 is easily seen by most people.

Color: As used in this disclosure, a color refers to the visible portion of the spectrum that is reflected off of an object that is exposed to an external source of electromagnetic radiation. A color is often referred to as a shade.

Color Spectrum: As used in this disclosure, a color spectrum refers to organization of ranges visible electromagnetic radiation into specific colors. Within this disclosure: a) electromagnetic radiation with wavelengths of 380 nm to 450 nm are called violet; b) electromagnetic radiation with wavelengths of 450 nm to 485 nm are called blue; c) electromagnetic radiation with wavelengths of 485 nm to 500 nm are called cyan; d) electromagnetic radiation with wavelengths of 500 nm to 565 nm are called green; e) electromagnetic radiation with wavelengths of 565 nm to 590 nm are called yellow; f) electromagnetic radiation with wavelengths of 590 nm to 625 nm are called orange; and, g) electromagnetic radiation with wavelengths of 625 nm to 740 nm are called red.

Diode: As used in this disclosure, a diode is a two terminal semiconductor device that allows current flow in only one direction. The two terminals are called the anode and the cathode. Electric current is allowed to pass from the anode to the cathode.

Exterior: As used in this disclosure, the exterior is used as a relational term that implies that an object is not contained within the boundary of a structure or a space.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Hue: As used in this disclosure, a hue refers to a specific color.

Lamp: As used in this disclosure, a lamp is an electrical circuit that generates (typically visible spectrum) electromagnetic radiation.

LED: As used in this disclosure, an LED is an acronym for a light emitting diode. A light emitting diode is a diode that is also a light source.

Light: As used in this disclosure, light refers to electromagnetic radiation that illuminates an area. Illumination is a synonym for light, particularly in cases where a measure of the amount of light in a space is called for.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

Interior: As used in this disclosure, the interior is used as a relational term that implies that an object is contained within the boundary of a structure or a space.

Momentum: As used in this disclosure, momentum is a measured quantity associated with the mass of a moving object. The momentum of the object equals the mass of the object multiplied by the velocity of the object. The exchange of momentum between two objects is a conserved quantity meaning that the sum of the momentums of the two objects before an exchange of momentum equals the sum of the momentums of the two objects after the exchange.

Momentum Sensor: As used in this disclosure, a momentum sensor is a sensor that detects changes in the momentum of an object. The momentum sensor generates one or more electric signals that indicate: a) the magnitude of the change of momentum; and, b) the direction of the change of momentum.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Spectrum: As used in this disclosure, a spectrum refers to the distribution and amplitude of the component frequencies of a source of electromagnetic radiation. Spectrums are typically organized and displayed by frequency or frequency range.

Vehicle: As used in this disclosure, a vehicle is a motorized device that is used for transporting passengers, goods, or equipment. The term motorized vehicle refers to a vehicle can move under power provided by an electric motor or an internal combustion engine. A motorized vehicle further comprises an electrical system that can be used as a source of electric energy. The enclosed passenger space of a vehicle is known as a cab.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Visually Distinct: As used in this disclosure, visually distinct is a comparative term between the perceived color of a first object and the perceived color of a second object. The second object is said to be visually distinct from the first object if the delta E between the measured CIELAB color specification of the first object and the measured CIELAB color specification of the second object is greater than. As a practical matter, most people would consider a delta E of greater than to be different colors under almost any light source.

Figure 2:
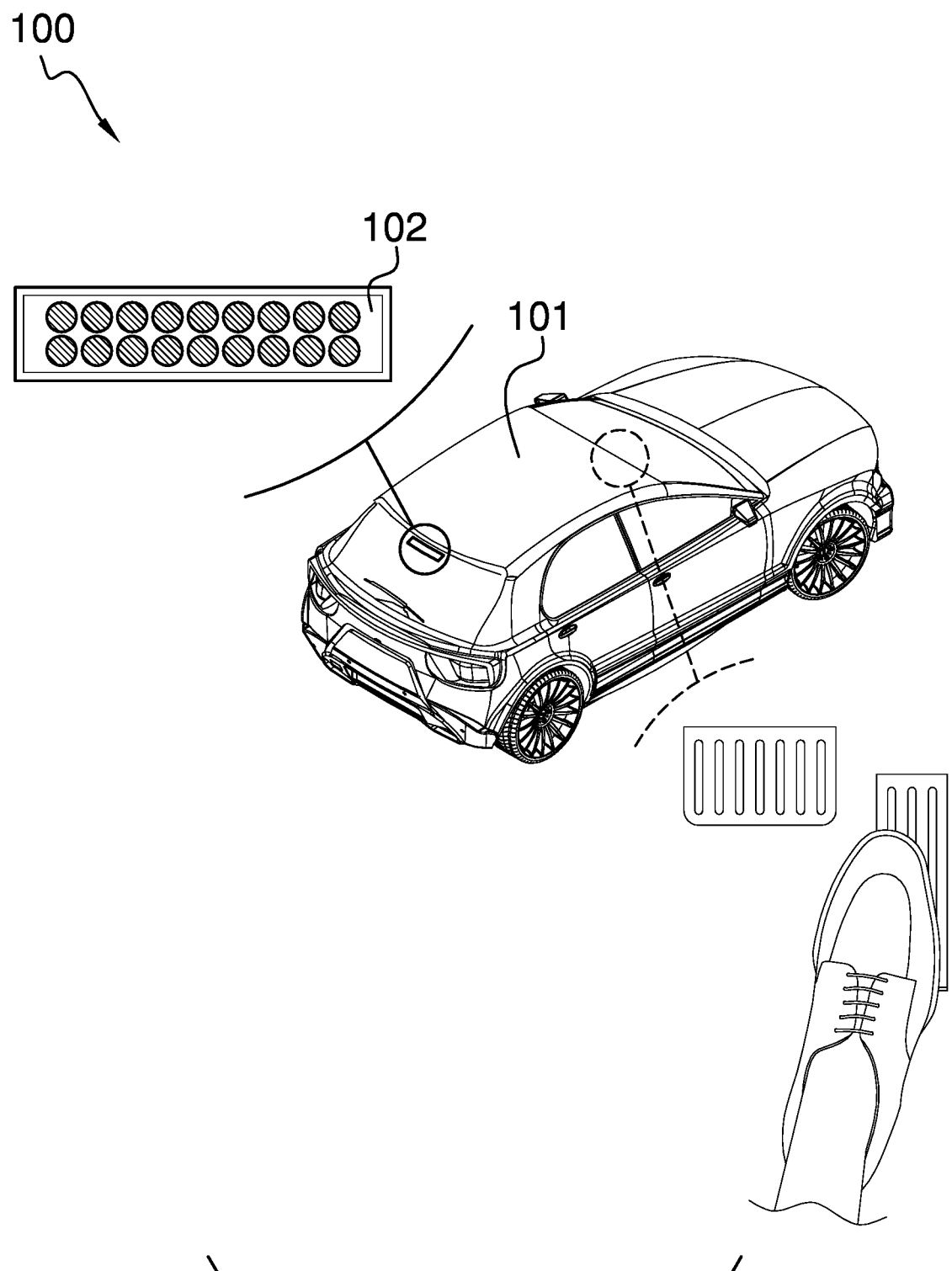
FIG. 2 is a detail view of an embodiment of the disclosure.
Figure 3:
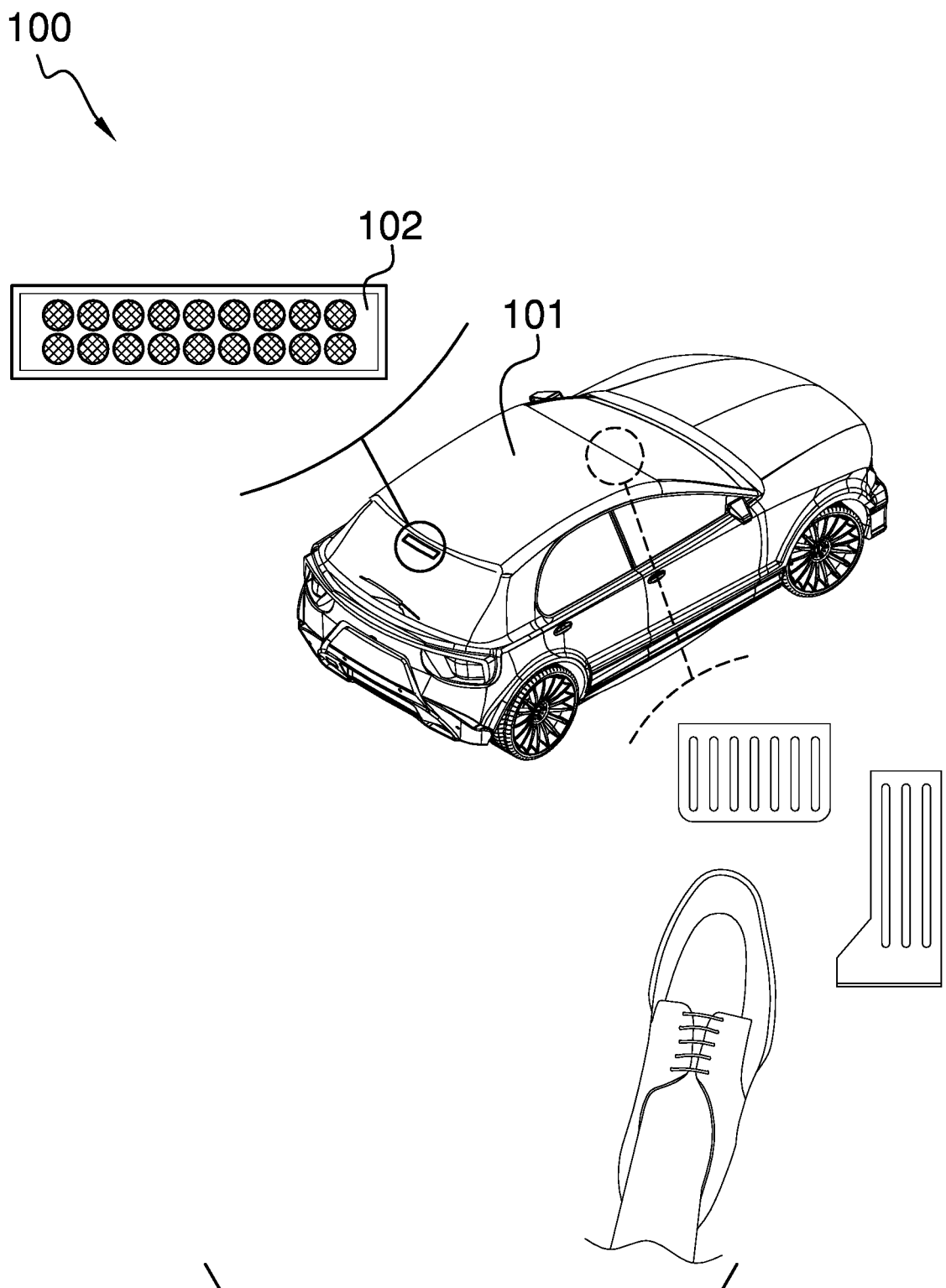
FIG. 3 is a detail view of an embodiment of the disclosure.
Figure 4:
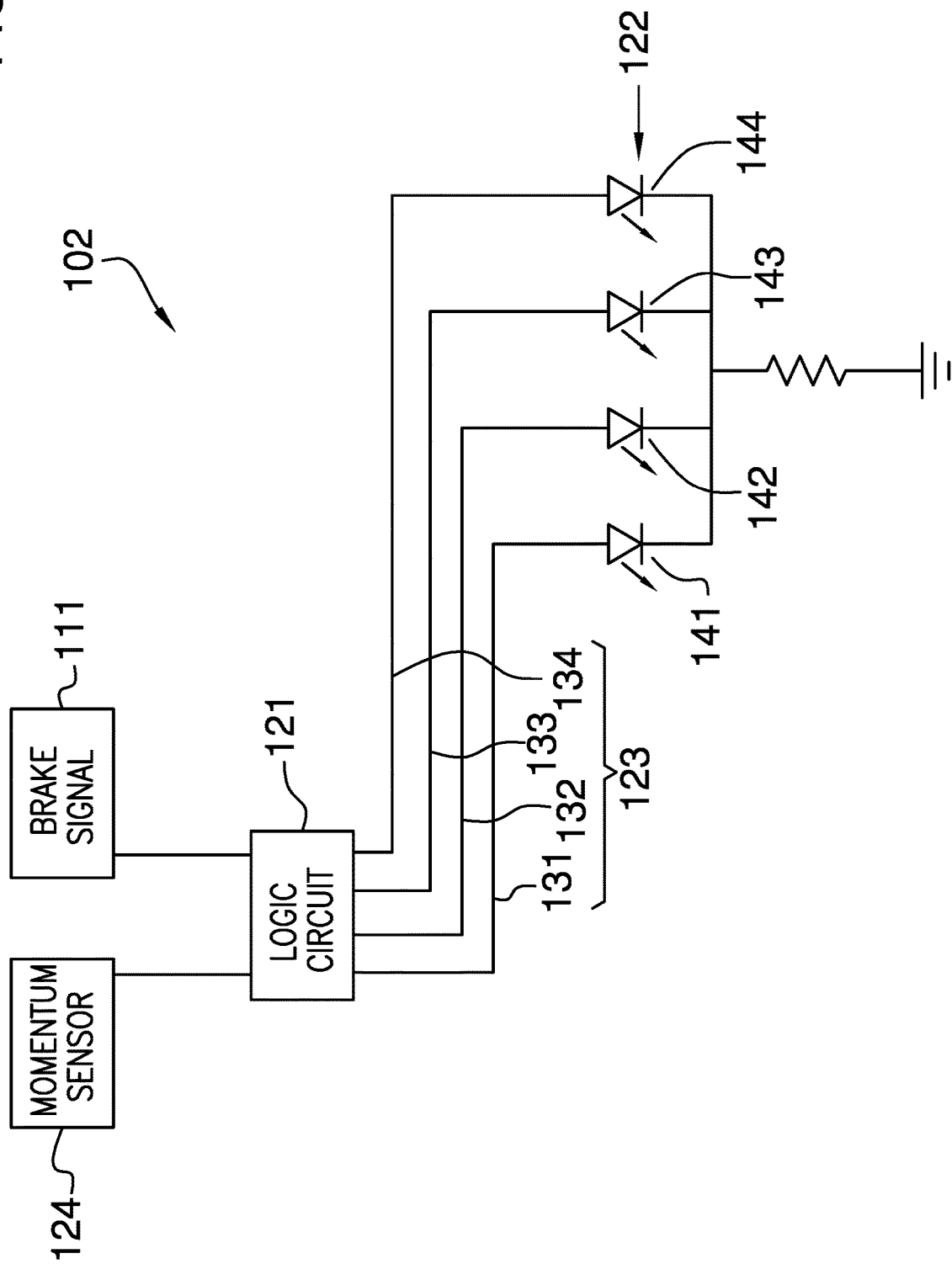
FIG. 4 is a schematic view of an embodiment of the disclosure.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A condition responsive vehicular taillight comprising a vehicle and a control circuit;
wherein the control circuit mounts in the vehicle;

wherein the control circuit comprises a logic circuit, a plurality of LED sets, a plurality of electric signals, and a momentum sensor;
wherein each LED set selected from the plurality of LED sets comprises a plurality of LEDs;
wherein the hue of the LEDs contained within any LED set initially selected from the plurality of LED sets is visually distinct from the hue of the LEDs contained within any LED set subsequently selected from the plurality of LED sets;
wherein the hue of each LED set selected from the plurality of LED sets visually indicates the momentum status of the vehicle.

2. The condition responsive vehicular taillight according to claim 1
wherein the condition responsive vehicular taillight is a safety device;
wherein the control circuit senses changes in the momentum of the vehicle;
wherein the control circuit generates a visual indication of the changes in the momentum of the vehicle;
wherein the visual indication is visible from the exterior of the vehicle;
wherein the visual indication is visible when viewed from the rear side of the vehicle.

3. The condition responsive vehicular taillight according to claim 2
wherein the vehicle further comprises a brake signal;
wherein the brake signal is an electrically generated control signal that is transmitted from the vehicle to the control circuit;
wherein the brake signal indicates to the control circuit that the brakes of the vehicle have been engaged.

4. The condition responsive vehicular taillight according to claim 3
wherein the control circuit is an electric circuit;
wherein the control circuit controls the generation of the visual indications of the change in the momentum of the vehicle;
wherein the control circuit uses the change in the momentum of the vehicle and the brake signal to determine the specific visual indication to be displayed.

5. The condition responsive vehicular taillight according to claim 4
wherein the logic circuit is an electric circuit;
wherein the logic circuit receives as input an electrically generated control signal from the momentum sensor;
wherein the logic circuit further receives as input the electrically generated control signal from the brake signal of the vehicle;
wherein the logic circuit uses the electric generated control signal generated by the momentum sensor to determine whether the momentum of the vehicle is changing in a manner selected from the group consisting of: a) the vehicle is accelerating; b) the vehicle; and, c) the vehicle is experiencing no change in momentum;
wherein the logic circuit uses the electrically generated control signal generated by the brake signal to determine whether the brake of the vehicle is engaged.

6. The condition responsive vehicular taillight according to claim 5
wherein the logic circuit generates an electric signal selected from the plurality of electric signals;
wherein the logic circuit uses the information received from the momentum sensor and the brake signal to determine which electric signal selected from the plurality of electric signals to generate.

7. The condition responsive vehicular taillight according to claim 6
wherein the momentum sensor is an electric sensor;
wherein the momentum sensor measures the change of the momentum of the vehicle during the operation of the vehicle;
wherein the logic circuit electrically connects to the momentum sensor;
wherein the logic circuit monitors the momentum sensor.

8. The condition responsive vehicular taillight according to claim 7
wherein each electric signal selected from the plurality of electric signals is a control signal;
wherein each electric signal selected from the plurality of electric signals electrically connects to an LED set selected from the plurality of LED sets;
wherein each electric signal selected from the plurality of electric signals electrically connects to the logic circuit;
wherein the logic circuit physically generates each electric signal selected from the plurality of electric signals;
wherein the logic circuit uses the plurality of electric signals to control the illumination of each LED set selected from the plurality of LED sets;
wherein each electric signal selected from the plurality of electric signals provides the electric energy required for the illumination of the LED set associated with the selected electric signal.

9. The condition responsive vehicular taillight according to claim 8
wherein the LED is a two terminal device used to generate illumination;
wherein each LED set selected from the plurality of LED sets electrically connects to an electric signal selected from the plurality of electric signals;
wherein the operation of each LED set selected from the plurality of LED sets is controlled by the electric signal selected from the plurality of electric signals that is associated with the selected LED set;
wherein the logic circuit uses the plurality of electric signals to control the operation of the plurality of LED sets;
wherein any LED initially selected from any LED set selected from the plurality of LED sets is identical to any LED subsequently selected from the same selected LED set.

10. The condition responsive vehicular taillight according to claim 9
wherein the plurality of electric signals comprises an acceleration signal, a deceleration signal, a hard braking signal, and a no momentum change signal;
wherein the acceleration signal is the signal selected from the plurality of electric signals that indicates that the vehicle is accelerating;
wherein the logic circuit generates the acceleration signal when the momentum sensor indicates to the logic circuit that the vehicle is accelerating;
wherein the deceleration signal is the signal selected from the plurality of electric signals that indicates that the vehicle is decelerating;
wherein the logic circuit generates the deceleration signal when the momentum sensor indicates to the logic circuit that the vehicle is decelerating;
wherein the hard braking signal is the signal selected from the plurality of electric signals that indicates that the vehicle is rapidly decelerating;
wherein the logic circuit generates the hard braking signal when: a) the momentum sensor indicates to the logic circuit that the vehicle is decelerating; while simultaneously, b) the brake signal further indicates to the logic circuit that the brake of the vehicle is engaged;

wherein the no momentum change signal is the signal selected from the plurality of electric signals that indicates that the vehicle is not experiencing a change in momentum;

wherein the logic circuit generates the no momentum change signal when the momentum sensor indicates to the logic circuit that the vehicle is not experiencing a change in momentum.

11. The condition responsive vehicular taillight according to claim 10 wherein the plurality of LED sets comprises a first LED set, a second LED set, a third LED set, and a fourth LED set;

wherein the first LED set is the LED set selected from the plurality of LED sets that visually indicates that the vehicle is accelerating;

wherein the second LED set is the LED set selected from the plurality of LED sets that visually indicates that the vehicle is decelerating;

wherein the third LED set is the LED set selected from the plurality of LED sets that visually indicates that the vehicle is decelerating;

wherein the fourth LED set is the LED set selected from the plurality of LED sets that visually indicates that the vehicle is decelerating.

12. The condition responsive vehicular taillight according to claim 11 wherein the hue of the LEDs contained in the second LED set is visually distinct from the hue of the LEDs contained in the first LED set;

wherein the hue of the LEDs contained in the third LED set is visually distinct from the hue of the LEDs contained in the second LED set;

wherein the hue of the LEDs contained in the third LED set is visually distinct from the hue of the LEDs contained in the first LED set;

wherein the hue of the LEDs contained in the fourth LED set is visually distinct from the hue of the LEDs contained in the third LED set;

wherein the hue of the LEDs contained in the fourth LED set is visually distinct from the hue of the LEDs contained in the second LED set;

wherein the hue of the LEDs contained in the fourth LED set is visually distinct from the hue of the LEDs contained in the first LED set.

13. The condition responsive vehicular taillight according to claim 12 wherein the acceleration signal electrically connects to the first LED set such that the first LED set is illuminated when the logic circuit actuates the acceleration signal;

wherein the deceleration signal electrically connects to the second LED set such that the second LED set is illuminated when the logic circuit actuates the deceleration signal;

wherein the hard braking signal electrically connects to the third LED set such that the third LED set is illuminated when the logic circuit actuates the hard braking signal;

wherein the no momentum change signal electrically connects to the fourth LED set such that the fourth LED set is illuminated when the logic circuit actuates the no momentum change signal.

* * * * *